(12) United States Patent
Cheng

(10) Patent No.: US 6,334,951 B1
(45) Date of Patent: Jan. 1, 2002

(54) REVERSE OSMOSIS WATER TREATMENT SYSTEM WITH TUBE CONNECTING UNIT

(76) Inventor: Ting-Kwok Cheng, No. 131, Min-Sheng St., Yangmei Town, Taoyuan County (TW)

( * ) Notice: Subject to any disclaimer, the term of this patent is extended or adjusted under 35 U.S.C. 154(b) by 0 days.

(21) Appl. No.: 09/570,346

(22) Filed: May 12, 2000

(30) Foreign Application Priority Data

May 13, 1999 (CN) ............................................. 99226611 U

(51) Int. Cl.[7] ................ B01D 63/00; C02F 1/44
(52) U.S. Cl. .................. 210/110; 210/117; 210/90; 210/97; 210/136; 210/257.2; 210/321.69
(58) Field of Search .................. 210/90, 97, 110, 210/117, 136, 194, 195.2, 257.2, 259, 321.6, 321.69

(56) References Cited

U.S. PATENT DOCUMENTS 3,786,924 A * 1/1974 Huffman
4,160,727 A * 7/1979 Harris, Jr.
4,808,302 A * 2/1989 Beall, Jr.
5,254,243 A * 10/1993 Carr et al. ...................................

* cited by examiner

Primary Examiner—Joseph W. Drodge
Assistant Examiner—Terry K. Cecil
(74) Attorney, Agent, or Firm—Dougherty & Troxell

(57) ABSTRACT

A reverse osmosis water treatment system includes a tube connecting unit 10 having a water incoming end 102, a water outgoing end 103, and a diaphragm 104 having a check valve 108 therein to allow water to flow directly from the incoming end to the outgoing end. In operation, water flows from the tube connecting unit through-hole 105 and into preliminary filtering units 2 and membrane unit 3 via the pipe assembly 1. Wastewater from the membrane unit drain end 31 is then routed back to the tube connecting unit via pipe assembly 42 and through-hole 106. A faucet 5 is provided at the water outgoing end to deliver water for non-drinking uses. By virtue of issuing water from the outgoing end, the membrane is washed and cleaned. Accordingly, the amount of discharged wastewater is greatly reduced so that water resources are conserved and the useful life of the membrane is prolonged.

4 Claims, 4 Drawing Sheets

REVERSE OSMOSIS WATER TREATMENT SYSTEM WITH TUBE CONNECTING UNIT

BACKGROUND OF THE INVENTION

The present invention relates to an improved reverse osmosis water treating device in which the preliminary filtered water produced during pure water making and discharged from the reverse osmosis membrane unit is transferred through a pipeline assembly to a preliminary filtered water-using/water outgoing end (faucet) for frequent non-drinking use so as to avoid waste and save water resources. By means of the great amount of waste water discharged from the water outgoing end, the membrane of the membrane unit is washed and cleaned. Accordingly, the useful life of the membrane is prolonged and the quality of the drinking water is enhanced.

The water from a water supply must first go through filtering, precipitation, chlorination and deodorization before it can then be transferred to a domestic faucet for drinking. Such water contains chemical material and people will smell an alien odor when drinking. In order to eliminate this shortcoming, various kinds of filters have been developed. In these filters, a reverse osmosis watertreating device filters off the impurities contained in the water. Such a device includes a tube connecting unit, a water pump, a preliminary filtering unit, a reverse osmosis membrane unit, a washing switch, a flow limiting valve, a shutting valve, a water reservoir and a pipeline assembly connected between the above units.

During the pure water-making procedure of the reverse osmosis water treating device, the ratio of the drinking pure water to the waste water continuously drained out through the flow limiting valve for maintaining the good filtering ability of the membrane is about 1:4. That is, for making one liter of pure water, about four liters of waste water will be drained out without reuse. However, in fact, the so-called waste water has been filtered through a preliminary filtering device to remove larger alien particles and fine particles or chemical material. Although such water is not drinkable, the water has a quality better than general tap water and can be used in cooking, cleaning or other fields. Therefore, it is wasteful to directly discharge such water. Moreover, the conventional water treating device must be periodically washed by manually activating the washing switch so as to clean off the impurities accumulating in the reverse osmosis membrane unit. This is for ensuring the quality of the water and prolonging the useful life of the membrane. Such procedure is inconvenient and troublesome to the user.

SUMMARY OF THE INVENTION

It is therefore a primary object of the present invention to provide an improved reverse osmosis water treating device including a tube connecting unit, a preliminary filtering unit, a membrane unit and pipeline assemblies connecting the above units. In the water treating device, the waste water draining end of the membrane unit is directly connected to a non-drinking water-using end the opening/closing of which is controlled by a switching valve. By the frequent use of the waste water discharged from the non-drinking water-using end, the membrane of the membrane unit is washed and cleaned. Accordingly, water resources are conserved, the useful life of the membrane is prolonged and the quality of the drinking water is enhanced. Moreover, by the frequent washing of the membrane, the membrane maintains a good filtering ability so that the flow limiting valve in the water-making procedure can be omitted or reduced.

It is a further object of the present invention to provide a reverse osmosis water treating device in which two ends of the tube connecting unit have a water incoming end (water source) and a preliminary filtered water-using end (faucet). Two through holes are respectively formed on the tube body near the two ends thereof. A diaphragm is located in the tube body to divide the tube body into two sections. One of the through holes via a first pipeline assembly is connected to the preliminary filtering unit and the reverse osmosis membrane unit. The other through hole via a second pipeline assembly is connected to a waste water draining end of the membrane unit. The preliminary filtered water produced during pure water making procedure and discharged from the waste water draining end of the membrane unit is transferred through the second pipeline assembly to the water outgoing end of the tube connecting unit for non-drinking use.

It is still a further object of the present invention to provide a reverse osmosis water treating device in which, in order to avoid decrement of the amount of the water discharged from the water outgoing end of the tube connecting unit due to a pressure drop, the diaphragm of the tube connecting unit is formed with a passage communicating the two sections with each other. A check valve, which is one-way flowable from the water incoming end to the water outgoing end, is disposed in the passage, whereby the water can directly flow from the water incoming end into the water outgoing end.

It is still a further object of the present invention to provide a reverse osmosis water treating device in which, in order to avoid back-flow due to lower pressure in the pipeline assembly, a check valve which is one-way flowable from the outer side to the inner side is disposed in the through hole of the water outgoing end.

The present invention can be best understood through the following description and accompanying drawings wherein:

DETAILED DESCRIPTION OF THE PREFERRED EMBODIMENT

Figure 1:
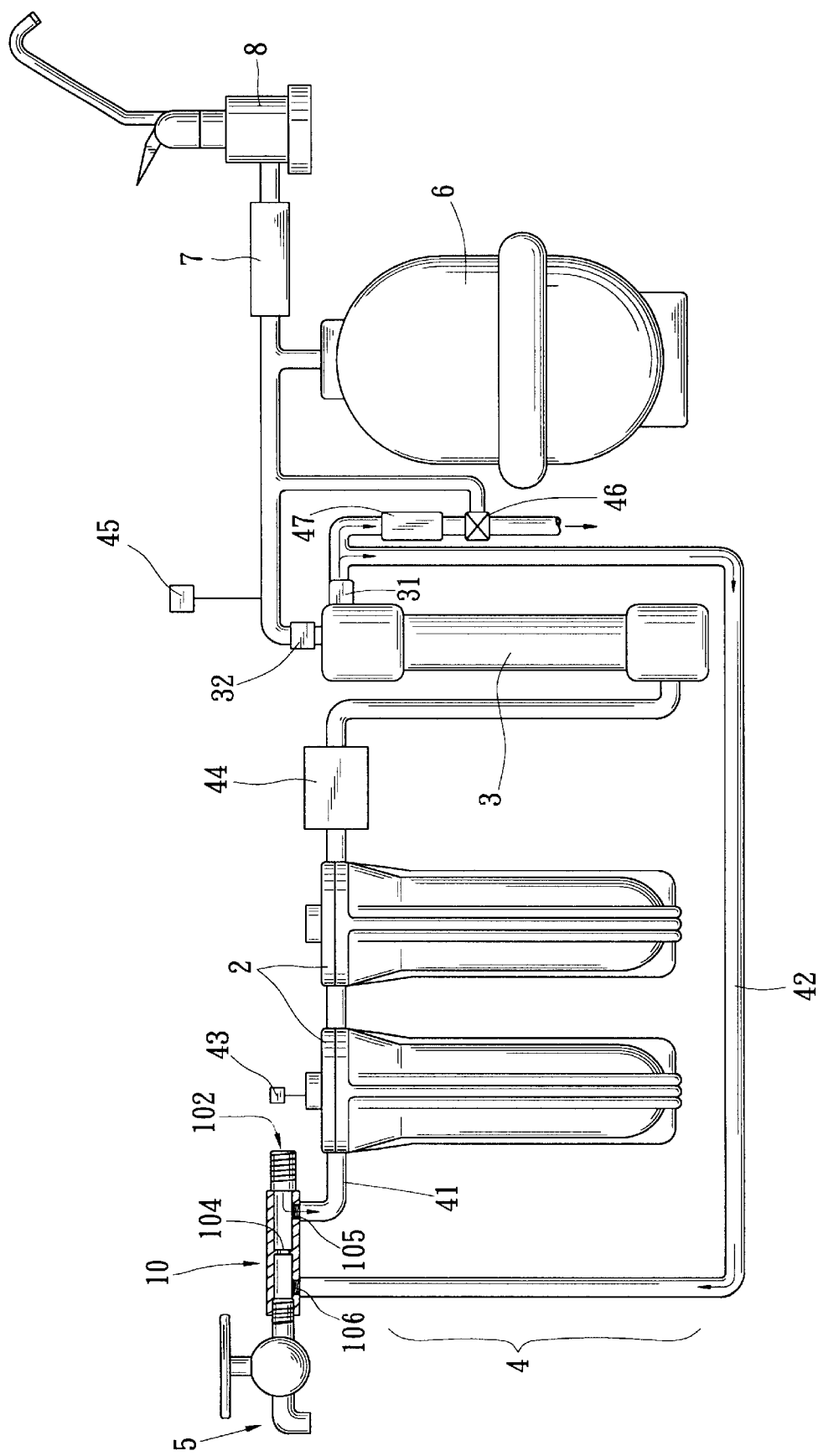
FIG. 1 is an assembled view of the present invention.

Please refer to FIGS. 1 to 4. The present invention includes a tube connecting unit 10, a preliminary filtering unit 2, a membrane unit 3 and a pipeline assembly 4 connecting the above units. The tube connecting unit 10 is a tube body having an internal diaphragm 104 and two through holes 105, 106. The tube connecting unit 10 has a water incoming end 102 (water source) and a preliminary filtered water-using/water outgoing end 103 (faucet or using end). The through hole 105 near the water incoming end, via a first pipeline assembly 41, is connected to the water incoming ends of the preliminary filtering unit 2 and the membrane unit 3. The other through hole 106 near the water outgoing end 103, via a second pipeline assembly 42 is connected to a waste water draining end 31 of the membrane unit 3. A low pressure switch 43 is located on the filtering unit 2 for detecting the state of the water source for further controlling the operation of a power water sucking unit 44

(such as a pump) mounted in front of the membrane unit 3. A check valve 32 and a high pressure switch 45 are located at a pure water output of the membrane unit 3. The membrane unit 3 is then, via a succeeding pipeline assembly connected to a pure water supplying end 8. The water reservoir 6 and a succeeding filtering unit 7 (such as coconut shell activated carbon filter) are further mounted at an output section in front of the water supplying end 8. The present invention is characterized in that the preliminary filtered water discharged from the waste water draining end 31 of the membrane unit 3 can be transferred through the second pipeline assembly 42 to the preliminary filtered water-using/water outgoing end 103 and faucet 5 of the tube connecting unit 1 for non-drinking use. Therefore, water resources can be saved. In addition, by means of frequent use of the preliminary filtered water-using end 103, a great amount of water is produced to wash the membrane unit 3. Accordingly, the membrane of the membrane unit 3 is always kept with low blockage so that the useful life of the membrane is prolonged and the average quality of the water is enhanced.

In addition, by means of frequent use of the preliminary filtered water-using end 103, the reverse osmosis membrane maintains a good filtering effect. Therefore, it is unnecessary to additionally mount a flow limiting draining valve behind the membrane unit 3 to remove the accumulated dirty water produced during the water making procedure. However, for enhancing the quality of drinking water, a bypass can be disposed behind the water draining end 31 of the membrane unit 3 and connected with a flow limiting valve 47. The bypass is controlled by a water shutting valve 46. The water shutting valve 46 can be controlled by the tank pressure or high pressure switch 45. When making pure water, the water shutting valve 46 can be opened to further reduce the amount of waste water drained from the flow limiting valve 47 so as to further save water resources.

Figure 2:
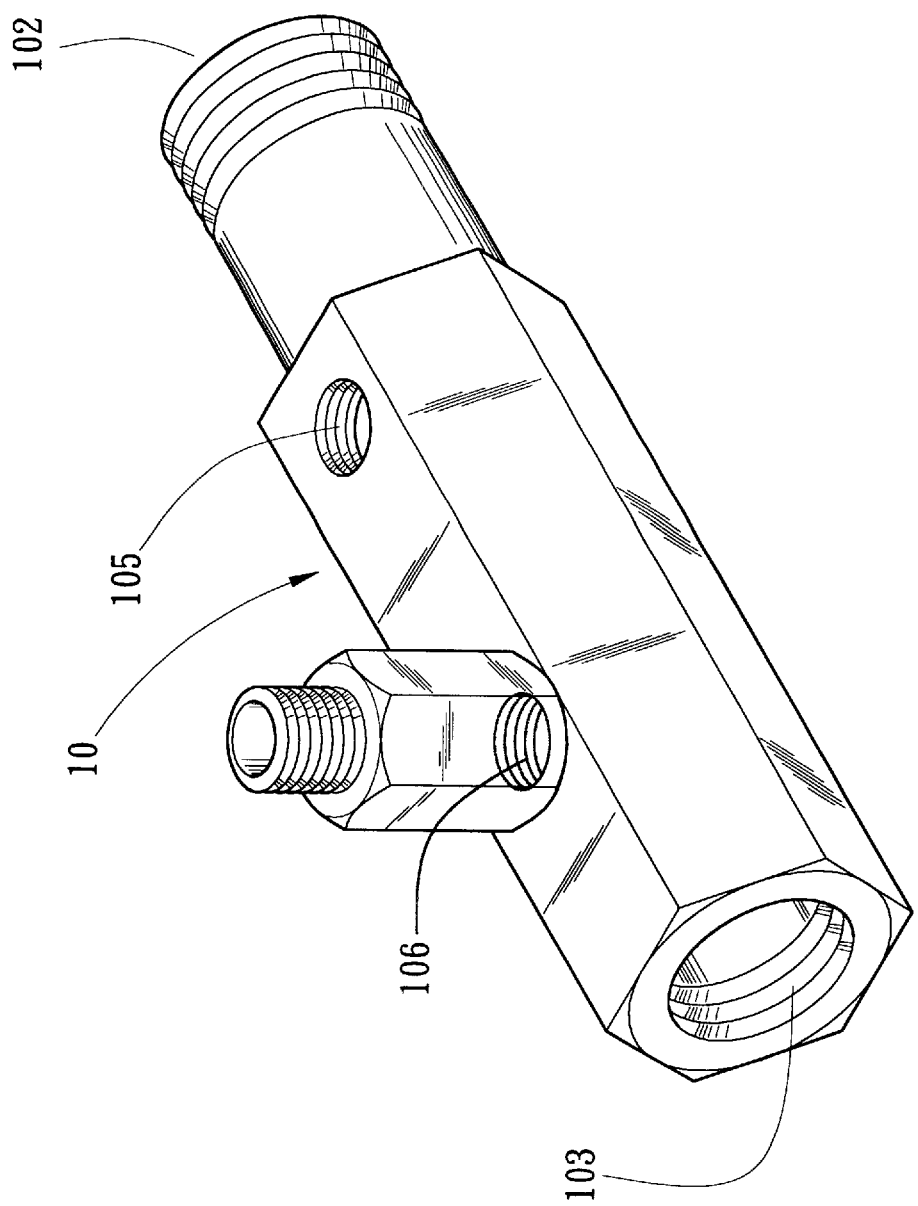
FIG. 2 is a perspective view of a preferred embodiment of the tube connecting unit of the present invention.
Figure 3:
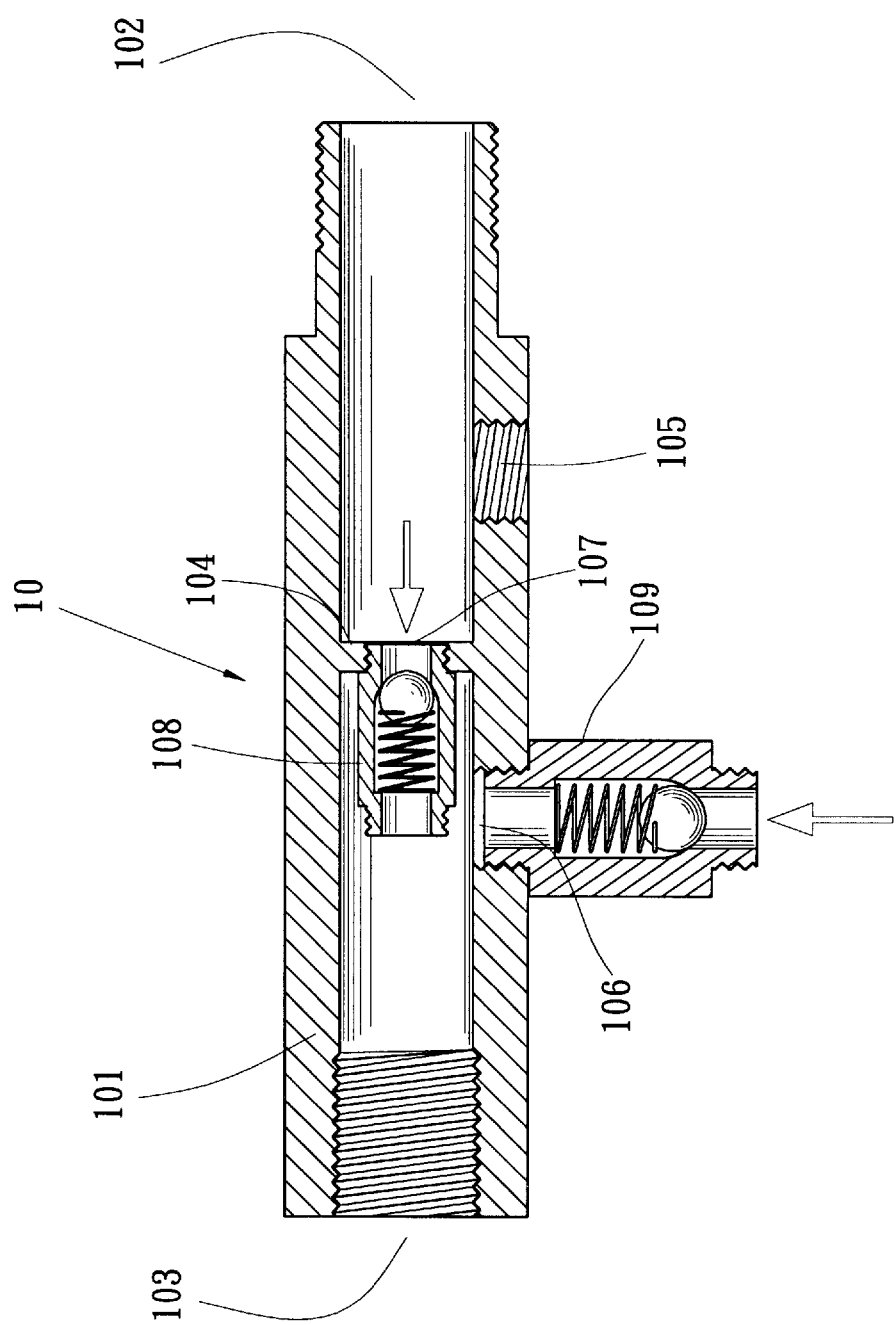
FIG. 3 is a cross-sectional view of the tube connecting unit of FIG. 2.

Referring to FIGS. 2 and 3, the diaphragm 104 between two ends of the tube body 101 of the tube connecting unit 10 divides the tube body 101 into two sections. The, lateral walls of the two sections are respectively formed with a first through hole 105 and a second through hole 106. The above-described water treating device can be externally connected between the first and second through holes 105, 106. Therefore, prior to use, the water is fully treated. In addition, the diaphragm 104 is formed with a passage 107 connecting the water incoming end 102 and the water outgoing end 103. A first check valve 108, which is one-way flowable from the water incoming end to the water outgoing end, is disposed in the passage 107. A second check valve 109, which is one-way flowable from an outer side to an inner side of the tube body, is disposed in the second through hole 106.

Figure 4:
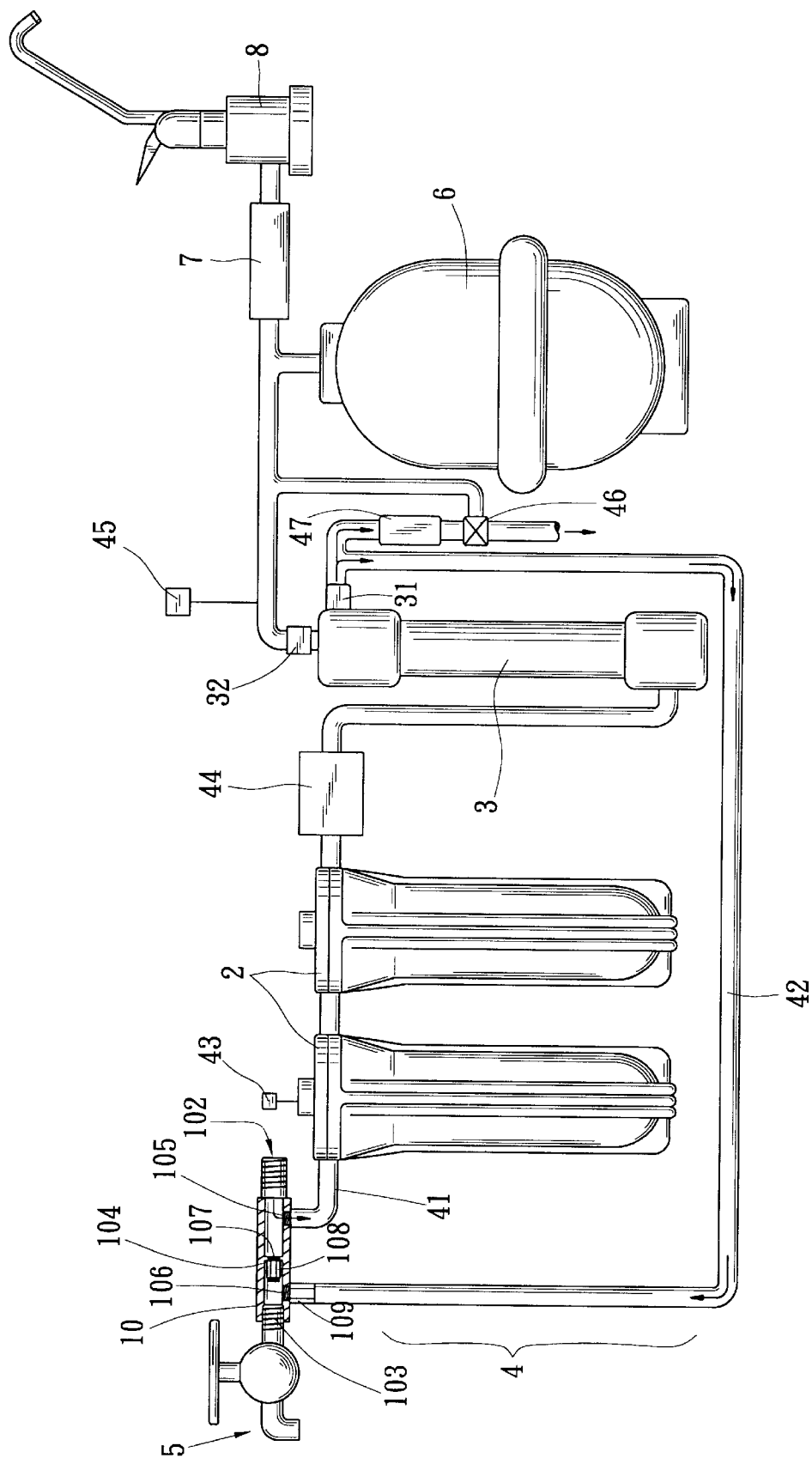
FIG. 4 is an assembled view showing an application using the tube connecting unit of FIG. 2.

FIG. 4 shows that the tube connecting unit 10 of FIGS. 2 and 3 is applied to a reverse osmosis treating system, in which the water incoming end 102 of the tube connecting unit 10 is connected to a water source, while the water outgoing end 103 is connected with a faucet 5. When the water flows into the tube body from the water incoming end 102 thereof, the water will flow out from the first through hole 105 and be transferred through an externally connected pipeline assembly 41 to the aforesaid filtering units 2, 3, 7 for filtering treatment. The treated pure water is then transferred to the water reservoir 6 for drinking or other uses. The waste water produced during the filtering procedure of the reverse osmosis membrane unit 3 can be sent back to the second through hole 106 through the second pipeline assembly 42 to flow out from the water outgoing end 103 and faucet 5. Therefore, the amount of the discharged waste water is limited and the water can be re-used to save water resources. The present invention employs only one single tube connecting unit to achieve the above effect so that the processing operation is easy and the cost is low.

The first check valve 108 permits the water from the water incoming end 102 to directly flow to the water outgoing end 103. The second check valve 109 prevents the water from back-flowing due to drop of water pressure in the second pipeline assembly 42.

The above embodiment is only used to illustrate the present invention, and is not intended to limit the scope thereof. Many modifications of the above embodiment can be made without departing from the spirit of the present invention.

What is claimed is:

1. A reverse osmosis water treating device comprising:
   a. a preliminary filtering unit, a reverse osmosis membrane unit, pipeline assemblies, and a tube connecting unit disposed between said pipeline assemblies;
   b. said tube connecting unit including a tube body comprising a water outgoing end, a water incoming end, and a diaphragm disposed between said ends dividing the tube body into two sections, said diaphragm including a passage having a check valve therein adapted to allow one-way flow between said water incoming end and said water outgoing end, said two sections respectively including first and second through-holes formed in lateral walls of the tube body; and
   c. said pipeline assemblies including a first pipeline assembly and a second pipeline assembly, one end of the first pipeline assembly being connected to the first through-hole in fluid communication with the water incoming end, another end of the first pipeline assembly being connected to the preliminary filtering unit and the reverse osmosis membrane unit, one end of the second pipeline assembly being connected to the second through-hole in fluid communication with the water outgoing end, another end of the second pipeline assembly being connected to a waste water draining end of the reverse osmosis membrane unit, said water outgoing end including a water valve adapted to deliver water for non-drinking uses, wherein said water for non-drinking uses has first passed through said preliminary filtering unit and said reverse osmosis unit draining end before passing through said water valve.

2. The reverse osmosis water treating device as claimed in claim 1, further comprising a low pressure switch mounted on the preliminary filtering unit and a power water pumping unit disposed in the first pipeline assembly, whereby the low pressure switch controls the operation of the power water pumping unit.

3. The reverse osmosis water treating device as claimed in claim 2, further comprising a high pressure switch disposed at a pure water output of the membrane unit for detecting the water pressure, whereby when the water pressure reaches a predetermined high pressure value, the high pressure switch turns off the power water pumping unit.

4. The reverse osmosis water treating device as claimed in claim 1 further comprising a second check valve which is adapted to allow one-way flow from an outer side to an inner side of the tube body and is disposed at the second thorough-hole of the tube body.

* * * * *